Mar. 5, 1929.  G. H. SAUTIER  1,703,957
SIGNAL DEVICE FOR AUTOMOBILES
Filed April 25, 1925  2 Sheets-Sheet 1

INVENTOR
G. H. SAUTIER
BY
ATTORNEYS

Mar. 5, 1929. G. H. SAUTIER 1,703,957
SIGNAL DEVICE FOR AUTOMOBILES
Filed April 25, 1925 2 Sheets-Sheet 2
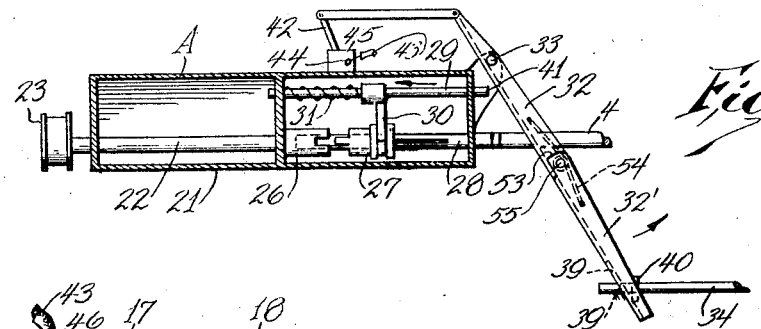
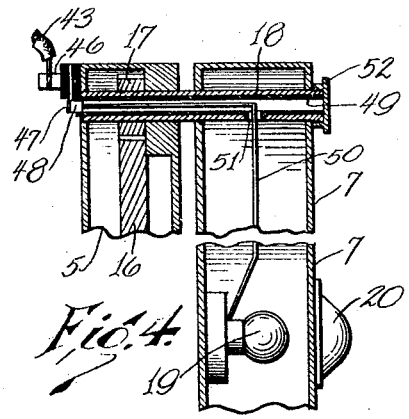
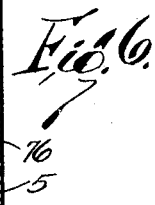
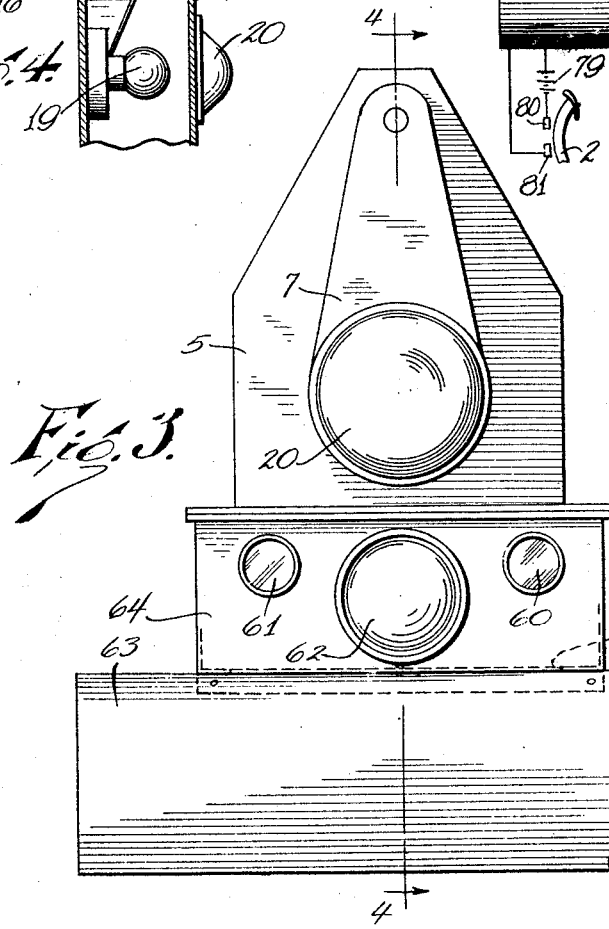
INVENTOR
G. H. SAUTIER
BY
ATTORNEYS Patented Mar. 5, 1929.

1,703,957

UNITED STATES PATENT OFFICE.

GEORGE H. SAUTIER, OF CHICAGO, ILLINOIS.

SIGNAL DEVICE FOR AUTOMOBILES.

Application filed April 25, 1925. Serial No. 25,931.

My invention relates to improvements in signal devices for automobiles, and it consists in the combinations, constructions, and arrangements herein described and claimed.

An object of my invention is to provide a signal device for automobiles in which I make use of a mechanical means for oscillating a warning signal, this means being actuated by the engine of the car or by a special motor if so desired. The signal when oscillated is adapted to close a circuit whereby the signal light is illuminated during the entire time the signal is operated.

A further object of my invention is to provide a device of the type described in which the device has means for indicating in which direction the automobile is to turn and for illuminating the license plate that is adapted to be carried by the signal casing.

Other objects and advantages will appear in the following specification, and the novel features of the invention will be particularly pointed out in the appended claims.

Figure 1:
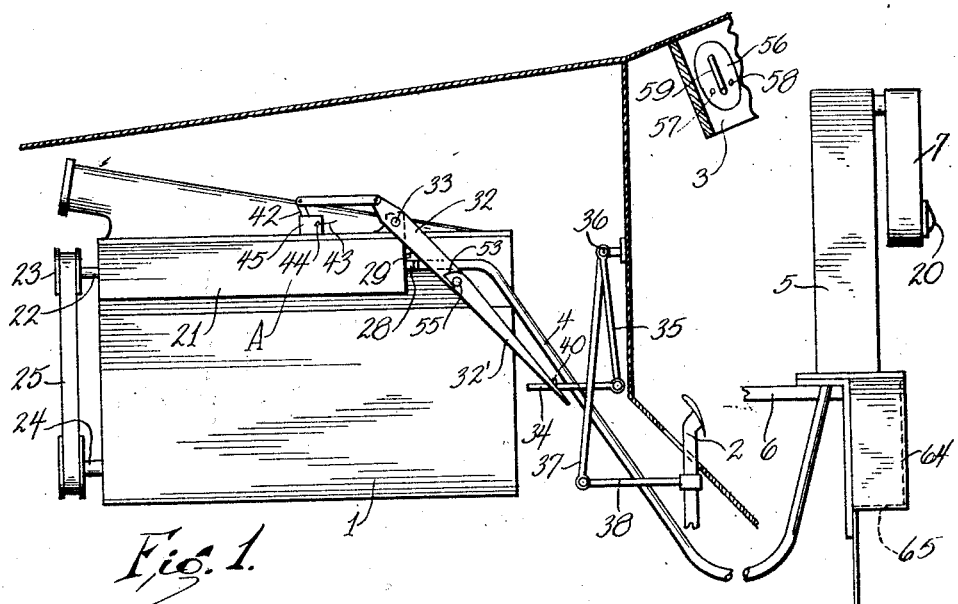
Figure 2:
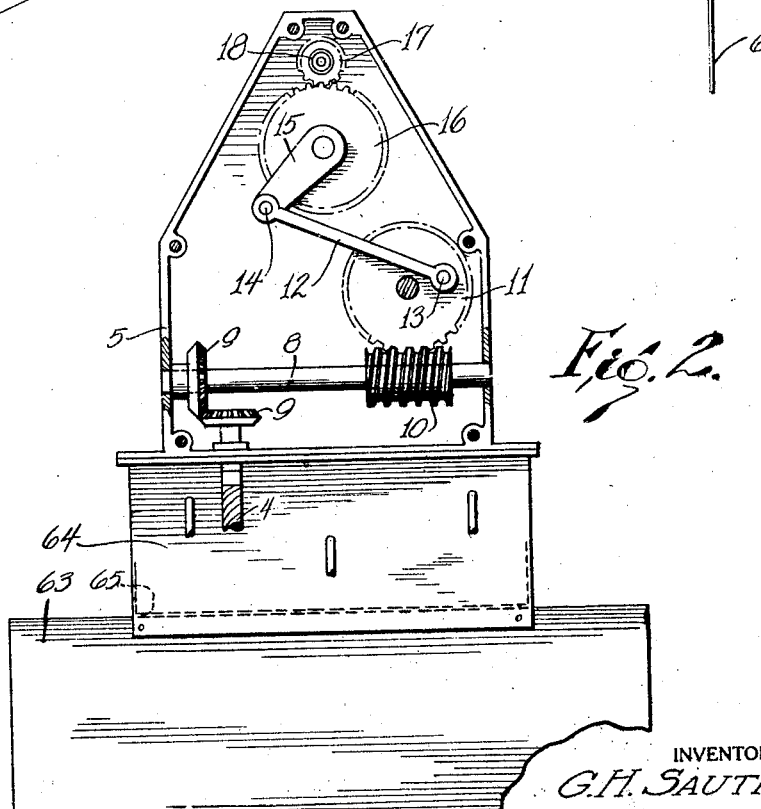

My invention is illustrated in the accompanying drawings, forming part of this application, in which Figure 1 is a diagrammatic view of portions of a car showing the device operatively applied thereto, Figure 2 is a vertical rear section of the device, Figure 3 is a rear elevation of the device, Figure 4 is a partial section along the line 4—4 of Figure 3, Figure 5 is a longitudinal section through the clutch mechanism, and Figure 6 is a modified form of signal actuating means.

In carrying out my invention I make use of an engine 1, a brake pedal 2 and an instrument board 3 of a car.

To the engine 1, I secure a special type of clutch mechanism A hereinafter described, and from this clutch mechanism I run a flexible shaft 4 that extends to the signal casing 5, the casing preferably being disposed at the rear of the automobile. In Figure 1, I show the casing as being supported by the luggage carrier 6 of the automobile. It is obvious that the device may be secured to any advantageous point at the rear of the car other than that shown in the drawing if the driver so desires.

I will now describe the specific means that is employed for oscillating a warning signal arm 7, see Figures 1 and 3. This arm is pivotally secured to the casing 5 and is adapted to be actuated by the mechanism shown in Figure 2. The flexible shaft 4 drives a shaft 8 by means of beveled gears 9. The shaft 8 carries a worm 10, and a worm gear 11 meshes with the worm 10. The worm gear 11 is carried by the casing and has a pitman 12 pivotally secured thereto at 13. The free end of the pitman is pivotally secured at 14 to an arm 15 that in turn is secured to a gear 16. A small gear 17 is in mesh with the gear 16 and in turn is rigidly secured to a hollow shaft 18, see Figure 4. From the mechanism thus far described, it will be noted that when the flexible shaft 4 is actuated, it will rock the hollow shaft 18.

The hollow shaft 18 is rotatably carried by the casing 5 and in turn supports the signal 7 in such a manner as to cause the signal to rock when the shaft 18 is rocked. The signal 7 carries a light 19 and also carries a signal glass 20 through which the light rays are adapted to pass. The glass 20 is preferably colored red so as to flash a warning signal when the light 19 is illuminated.

Having described the mechanism for oscillating the signal arm 7, I will now describe the clutch mechanism used in conjunction with the signal actuating mechanism. In Figure 1, I show this clutch mechanism as being mounted on the engine 1, and in Figure 5, I show a longitudinal section through the clutch mechanism. This mechanism comprises a housing 21 in which a shaft 22 is rotatably mounted. The shaft 22 projects beyond the housing and carries a pulley 23. The pulley 23 is connected to the crank shaft 24 by means of a belt 25. As soon as the engine starts running, it will rotate the shaft 22. One member 26 of a clutch is mounted upon the shaft 22, while the other member 27 is slidably mounted on a shaft 28 and is keyed thereto. A guide rod 29 is also carried by the housing 21 and an arm 30 is rigidly secured to the rod 29 and bears against the clutch member 27 so as to move the member into and out of engagement with the clutch member 26. A coil spring 31 is also mounted upon the rod 29 and is adapted to move the clutch member 27 into the position shown in Figure 5. It will be seen from this construction that a movement of the rod 29 will move the clutch member 27 into engagement with the clutch member 26. The shaft 28 has one of its ends rotatably mounted in the clutch member 26, whereby the shaft will be rotated when the two clutch members 26 and 27 are moved into engagement with each other. The shaft 28 is connected to the flexible shaft 4 and therefore when the shaft 28 is rotated, it will rotate the flexible shaft 4 so as to oscillate the signal 7.

Means for moving the rod 29 is actuated by the brake pedal 2. The connections between the brake 2 and the rod 29 are shown in Figures 1 and 5. A lever 32 is pivotally carried by the housing 21 at 33 and has its lower free end connected by means of a rod 34 to an arm 35. The arm in turn is secured to a shaft 36 and this same shaft carries an arm 37. A link connection 38 extends between the brake pedal 2 and the arm 37. The rod 34 is slidably received in an opening 39 in the lever 32 and carries a projection 40 that is adapted to engage with the lever 32 so as to actuate the lever when the brake pedal 2 is actuated. The lever 32 contacts with the end 41 of the rod 29 and moves the rod in the direction of the arrow shown in Figure 5. In this manner, the clutch is actuated and connects the engine with the flexible shaft 4.

In addition to the lever actuating the rod 29, I also cause the lever to throw a switch arm 42, the arm in turn closing a circuit from a source of current to the light 19. When therefore the lever 32 is swung, it will cause the current to flow through the circuit and to energize the light 19. The wire 43 leading from the contact 44 of the switch 45 is connected to a terminal 46. A brush 47 carries the terminal 46 and bears against a contact 48. The brush 47 is insulated from the casing 5 and so is also the contact 48. The contact 48 is carried by an insulating tube 49, the tube extending the entire length of the hollow shaft 18. A wire 50 leads from the contact 48 to the light 19. This wire passes through an opening 51 in the hollow shaft 18. A cap screw 52 closes the free end of the hollow shaft 18 and also aids in locking the shaft to the casing 7.

I provide yielding means for permitting the portion 32′ of the lever 32 to keep on swinging after the rod 29 has been moved into its furthest position. A lug 53 is carried by the portion 32′ and bears against the part 32 so as to prevent the swinging of the part 32′ in the direction of the arrow shown in Figure 5 with respect to the part 32. A coil spring 54 yieldingly holds the lug 53 in contact with the part 32. It will be seen from this construction that when the lever 32 has been swung so as to move the rod 29 into operative position, the part 32′ may still be swung and in swinging will pivot about the pin 55 and will compress the spring 54. As soon as the brake pedal 2 is released, however, the spring 54 will return the part 32′ into alignment with the part 32 as is shown in Figure 5.

In Figure 1, I show the instrument board 3 as carrying a switch 56 that has two terminals 57 and 58 and a switch arm 59. The switch arm 59 is adapted to be swung over either of the two terminals and will energize the lights 60 and 61 when contacting with the terminals. In this way the driver indicates to pedestrians or drivers of other automobiles in what direction he is about to turn.

From the foregoing description of the various parts of the device, the operation thereof may be readily understood. The device may be readily applied to an automobile with but slight alterations being necessary in the latter. The clutch mechanism A is secured to the engine and the signal is secured to the rear of the car. The lever 32 is then connected to the brake pedal 2 and the device is now ready for operation.

Assume that the driver wishes to turn to the right. He first swings the arm 59 of the switch 56 over the contact terminal 58 whereupon the right-hand light 60, see Figure 3, is energized. Before taking the turn, the driver slows down the car and in doing so depresses the brake pedal 2. The brake pedal 2 swings the lever 32 and causes the clutch to connect the flexible shaft 4 with the shaft 22. The lever 32 also swings the switch arm 42 so as to energize the light 19. The flexible shaft 4, when rotated, oscillates the warning arm 7 and thereby attracts the attention of the drivers in approaching cars. The moving arm 7 quickly attracts attention and this together with the light 60 fully informs the driver in the approaching car that the car ahead is about to turn to the right. The same is true when the car to which the signal is attached makes a left turn except in this instance the light 61 is energized instead of the light 60.

In night driving, the tail light 62 is energized in the ordinary manner and this light also illuminates the license plate 63. The bottom of the casing 64 is cut away as at 65 for this purpose. It should be noted that the arm 7 will continue to oscillate and the light 19 will be energized as long as the brake pedal 2 is held in operative position. The lever 32 is constructed so as to limit the movement of the brake pedal 2. After the lever 32 has been moved so as to throw the clutch into engagement, the part 32′ thereof is adapted to swing still further so as to permit the brake pedal 2 to be moved as far as necessary when applying the brakes.

In Figure 6, I show a slightly modified form of the device and in this form, the signal arm oscillating mechanism is actuated by a motor 75 instead of the flexible shaft 4. The shaft 76 of the motor is provided with a helical gear and meshes with a helical gear 78 that is mounted on the shaft 8. In this way, the shaft 8 is operated by the motor 75 instead of being operated by the flexible shaft 4. The motor 75 is connected to a source of current 79 and with two contact points 80 and 81. The brake pedal 2 when actuated is adapted to close the circuit between the contacts 80 and 81 so as to energize the motor. In this way the signal arm 7 is operated each time the brake pedal 2 is actuated. The provision of the motor 75 does away with the flexible shaft 4 and the clutch A. The rest of the device operates in the same manner as set forth in the description of the preferred form of the device.

I claim:

1. The combination with an engine of an automobile having a crank shaft, of a warning signal comprising a casing, a signal arm rotatably carried by said casing, and means for operatively connecting said signal arm to the crank shaft of said engine, whereby an oscillatory movement may be imparted to said signal arm.

2. The combination with an engine having a crank shaft, and a brake pedal, of a warning signal comprising a casing, a signal arm pivotally carried by said casing, actuating means for imparting an oscillatory movement to said signal arm, and means actuated by the movement of said brake pedal for operatively connecting said actuating means with said crank shaft.

3. The combination with an engine having a crank shaft, and a brake pedal, of a warning signal comprising a casing, a signal arm pivotally carried by said casing, actuating means for imparting an oscillatory movement to said signal arm, and means actuated by the movement of said brake pedal for operatively connecting said actuating means with said crank shaft, said connecting means including a flexible shaft.

GEORGE H. SAUTIER.